United States Patent Office 3,660,532
Patented May 2, 1972

3,660,532
CASTABLE ELASTOMERS AND THEIR MANUFACTURE
Byron H. Werner, Akron, and Robert A. Hayes, Cuyahoga Falls, Ohio, assignors to The Firestone Tire & Rubber Company, Akron, Ohio
No Drawing. Filed Jan. 30, 1970, Ser. No. 7,271
Int. Cl. C08f 21/02
U.S. Cl. 260—861                    24 Claims

ABSTRACT OF THE DISCLOSURE

A polyester diol or a polyether diol or other diol is reacted with a monomeric unsaturated anhydride or acid chloride to produce a terminally unsaturated adduct having a molecular weight of 2,000 to 20,000. On polymerization of this prepolymer with styrene or other vinyl monomer a castable, vulcanized elastomeric resin is obtained.

---

This invention relates to castable vulcanizable elastomeric resins. It includes the resins, their manufacture and use. The resins are useful as potting compounds, vibration dampeners, etc., and are useful for the preparation of laminates and for rotational casting to produce mechanical goods.

These resins are formed from a polymerizable adduct produced by reacting (1) a polyester diol or a polyether diol or a saturated hydrocarbon diol, or a diol of an essentially saturated hydrocarbon polymer with (2) a monomeric unsaturated anhydride or unsaturated acid chloride. The polyester diol may be a polycaprolactone or an alkyl polycaprolactone in which the alkyl group contains 1 to 4 carbon atoms. The reaction is usually carried out at about 70 to 130° C. The molecular weight of this polymerizable adduct is controlled to between 2,000 and 20,000, and preferably 5,000 to 12,000, and when it is polymerized with 50 percent by weight or less of styrene or other vinyl monomer, an elastomeric resin is obtained.

The production of polymerizable adducts which are then polymerized with a vinyl monomer such as styrene, is known in the art. See British Pats. 755,321 and 897,335. However, it has not been known that by controlling the molecular weight of the polymerizable adduct, and by introducing unsaturation only at the ends of the adduct for polymerization with the vinyl monomer, elastomeric products are obtained.

An elastomer is a material that is capable of recovery from large deformations quickly and forcibly and can be, or readily is, modified to a state in which it is essentially insoluble (but can swell) in boiling solvent, such as benzene, methyl ethyl ketone and ethanoltoluene azeotrope. In its modified state, free of diluents, an elastomer retracts within one minute to less than 1.5 times its original length after being stretched at room temperature (18 to 29° C.) to twice its length and held for one minute before release.

The diols are polyester diols or polyether diols or saturated hydrocarbon diols of hydrogenated diene or diols of essentially saturated hydrocarbon polymers. Their molecular weights are controlled so that on subsequent reaction with an unsaturated anhydride or acid chloride the adduct produced has a molecular weight of 2,000 to 20,000.

It may be theorized that the elastomeric properties of the final products produced from these adducts are due to their structure being similar to that of a vulcanized rubber. The formulae are compared below, in which each R represents a section of the molecular chain between double bonds reacted with sulfur (in the case of rubber) or a vinyl monomer represented by styrene (in the case of the resins of this invention). In these formulae, S represents sulfur and St represents styrene or a polymer thereof.

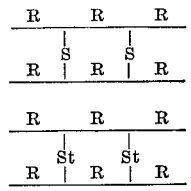

Reinforcement with a usual rubber reinforcing agent of 0.002 to 1.0 micron in diameter has proven advantageous.

FORMATION OF UNSATURATED ADDUCT OF DIOL

Unsaturation is introduced onto each end of the long chain diol through use of the appropriate unsaturated anhydride or acid chloride. The unsaturation of the diol adduct must be such that the formed adduct is polymerizable with the intended vinyl monomer.

The anhydrides which may be used to form the adducts are unsaturated anhydrides of aliphatic carboxylic acids and contain 3 to 14 carbon atoms. These anhydrides are represented by such formulae as

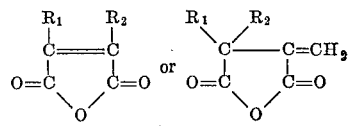

where $R_1$ and $R_2$ are hydrogen or alkyl radicals each containing 1 to 4 carbon atoms. Both $R_1$ and $R_2$ may be the same or they may be different. These anhydrides include maleic anhydride, acrylic anhydride, methacrylic anhydride, ethacrylic anhydride, butacrylic anhydride and other polymerizable homologs of the anhydride of acrylic acid. Other anhydrides which may be used include itaconic and citraconic anhydrides.

Acid chlorides which may be used to react with the diols contain 3 to 9 carbon atoms and include acryloyl chloride, methacryloyl chloride, butacryloyl chloride and their polymerizable homologs. These may be represented by the formula

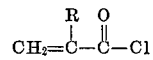

where R may be hydrogen or an alkyl radical containing 1 to 6 carbon atoms.

Polymerizable unsaturation may also be added to the diol by first reacting each hydroxyl group with one mole of a diisocyanate such as toluene diisocyanate. The free isocyanate group, in turn, may be reacted with a pendant hydroxyl or carboxyl of a monomeric material such as ethylene glycol methylmethacrylate or methacrylic acid to form an adduct which may then be copolymerized with catalyzed vinyl monomers such as styrene.

POLYMERIZATION

Instead of polymerizing the adducts with styrene, other vinyl monomers polymerizable with a peroxide catalyst may be used including, for instance, alpha-methyl styrene, chlorostyrenes, t-butyl styrene, acrylonitrile, vinyl acetate and acrylates and methacrylates with alkyl groups containing 1 to 8 carbon atoms and mixtures thereof.

Acrylamide and other solid vinyl monomers may be used in small amounts with liquid vinyl monomers. Divinyl benzene may be used to increase the cross-linking density. These monomers and polymers thereof cross-link the adduct chains at temperatures ranging from room temperature to about 250° F., giving elastomeric resins such as suggested by the above diagram in which the cross-linking monomer is styrene. The elastomers have a Shore A hardness of 25 to 100.

The adducts, before polymerization, are liquid at room temperature or other commercially utilizable temperature in which the adduct or its polymerization may be carried out, such as a temperature from room temperature to 70° C. The adducts are mixed with the vinyl monomer, usually with a polymerization catalyst and cast into a mold or used for lamination, etc. Usually the polymerization is accelerated by increasing the temperature, by heating the reaction mixture either before or after casting or laminating. The temperature will vary with the vinyl monomer and the polymerizable units of the adduct, as is well known to one skilled in the art. The polymerization catalysts which can be used are well known peroxide catalysts, and include benzoyl peroxide, cumene peroxide and lauroyl peroxide, etc. with or without salts of cobalt, tin, lead and manganese or other metals which may serve as redox-type catalysts to permit polymerization of the vinyl monomer at reduced temperature.

By increasing the number of styrene linkages, i.e. by reducing the length (molecular weight) of the linkages between the cross-links, the resin becomes harder and less elastomeric; and if there are not enough styrene linkages (as in the case at the start of the polymerization) the resulting product is a liquid.

Reinforcement with a usual rubber reinforcing agent, e.g. finely divided silica of an average particle size of 0.002 to 1.0 micron in diameter, has proven advantageous.

POLYESTER DIOLS

The polyester diols used in carrying out this invention are those which are produced in the reaction of a glycol with an aliphatic saturated dicarboxylic acid or anhydride or a mixture of such acids and/or anhydrides with less than 10 mole percent of an aromatic dicarboxylic acid such as phthalic, isophthalic or terephthalic acid, for example. Aliphatic acids and anhydrides are preferred. The polyester diol must be such as to give elastomeric properties to the final product. Suitable dicarboxylic acids are those which contain 3 to 9 carbon atoms, including, for example, malonic, glutaric, succinic, adipic, pimelic, suberic and azelaic acids or the anhydrides thereof or mixtures of such acids and/or anhydrides.

Glycols which may be used in the esterification with the above dicarboxylic acids or anhydrides consist of those diols which contain 2 to 6 carbon atoms, including, for example, ethylene glycol, propanediol, butanediol, pentanediol, hexanediol, or mixtures thereof.

The esterification reaction may be carried out according to well known procedures so as to produce a polyester terminated with hydroxyl groups and of suitable molecular weight, namely, about 2,000 to 20,000.

Polyester diols may also be prepared from such monomers as caprolactone, or an alkyl caprolactone in which the alkyl group contains 1 to 4 carbon atoms, or mixtures thereof, by initiating the polymerization with a diol and suitable catalyst. The molecular weight of the resulting polyester is controlled by the quantity of the diol used, which is just sufficient to hydroxylate the terminal carbons. The following preparation is typical.

Example 1

| | Grams |
|---|---|
| Epsilon-methyl-caprolactone, pure | 300.0 |
| Ethylene glycol, pure | 2.69 |
| Tetraisopropyl titanate | 0.3 |

The above materials were charged to a suitable reactor and heated under nitrogen to 170° C. for 16 hours. The product was then stripped at 120 to 140°C. and 1–2 mm. Hg for two hours, and found to have a molecular weight of 6670 with a hydroxyl number of 16.8.

The above polymethyl caprolactone diol was then reacted with maleic anhydride to form the adduct as follows:

Example 2

| | Grams |
|---|---|
| Polymethyl caprolactone, M.W. 6670, 0.0225 mole | 150.0 |
| Maleic anhydride, 0.0495 mole, 10% excess | 4.9 |

The above mixture was stirred in a flask under nitrogen for 16 hours at 115 to 120° C. The product was mixed with catalyzed styrene (0.5 part benzoyl peroxide per 100 parts by weight of styrene) in various proportions, and samples were cured for one hour at 200° F. between cellophane sheets in a 6" x 6" x .100" single-cavity mold. The cured samples containing more than 50 percent styrene tended to be plastic in nature, clear, and possessed rather interesting properties. The sample which contained 70 percent styrene had a notched Izod impact strength of 19.3 foot pounds and was extremely tough.

Cured samples which contained 50 percent and less styrene were interesting elastomers with properties as indicated below:

| Percent styrene | Tensile, p.s.i. | Elongation, percent | Modulus 100% | 200% | 300% | Hardness |
|---|---|---|---|---|---|---|
| 50 | 1,900 | 500 | 375 | 525 | 725 | 30 Shore D. |
| 40 | 900 | 475 | 50 | 100 | 250 | 50 Shore A. |

Polycaprolactone diols may be prepared by substituting caprolactone or another alkyl caprolactone for the methyl caprolactone to also give polyester diols.

The maleic anhydride adduct of such a polycaprolactone diol was prepared as follows:

Example 3

| | Grams |
|---|---|
| Polycaprolactone diol, M.W. 2029, 0.3450 mole | 700.0 |
| Maleic anhydride, 0.8627 mole (25% excess) | 84.6 |

The above mixture was stirred under nitrogen at 120 to 125° C. for 6 hours and mixed with catalyzed styrene in various proportions. The styrene was catalyzed with 0.5 part benzoyl peroxide per 100 parts monomer.

The resulting samples were cured one hour at 200° F. in a 6" x 6" x .100" single-cavity mold. Evaluation results were as follows:

| Percent styrene | Tensile, p.s.i. | Elongation | 100% modulus | Hardness |
|---|---|---|---|---|
| 50 | 2,150 | 210 | 625 | 56 Shore C. |
| 40 | 700 | 155 | 250 | 57 Shore A. |
| 30 | 275 | 110 | 225 | 54 Shore A. |

These diols are completely saturated or substantially completely saturated, and may be described as essentially saturated.

SATURATED HYDROCARBON DIOLS

Saturated hydrocarbon diols may be made from ethylene and propylene, etc. monomers which have been polymerized and hydroxylated.

They may also be made by hydrogenation of polymers of conjugated dienes such as those containing 4 to 6 carbon atoms, and include more importantly hydrogenated polybutadiene and polyisoprene with a molecular weight of 2,000 to 20,000.

The method of preparing diols from polybutadiene, for instance, has been previously described by Hayashi and Marvel (J. of Polym. Sci., Part A, Vol. 2, pages 2571–2594 (1964)). This involves the polymerization of pure butadiene monomer utilizing an alkali metal complex catalyst such as lithium biphenyl in pure tetrahydrofuran.

This living polymer then was further reacted with ethylene oxide to give the diol (or hydroxyl end-grouped polybutadiene).

Using this technique, Polymer A, a polybutadiene diol, was prepared with a molecular weight of 1500. A portion of this material was essentially completely hydrogenated using a platinum oxide catalyst at 50 to 60° C. and is identified as Polymer B.

Both Polymers A and B were reacted with maleic anhydride, forming with each an adduct of the anhydride portion of the maleic anhydride with the hydroxyl end groups of the polybutadienes. The following preparation is typical:

Example 4

|  | Grams |
|---|---|
| Polymer A (nonhydrogenated polybutadiene diol, M.W. 1500, 0.133 mole) | 200.0 |
| Maleic anhydride, 0.266 mole | 26.2 |

The polybutadiene diol was heated to 85° C. under nitrogen in a three-necked 500 ml. round-bottom flask, and the maleic anhydride was added with stirring. Temperature of the reaction mass was then raised to 120° C. with continued stirring for 6 hours. The adduct product was then poured into a jar under nitrogen and cooled preparatory to mixing and polymerizing with a monomer.

The maleic anhydride adduct of Polymer B was also prepared, substituting Polymer B in the above recipe.

Styrene monomer catalyzed with 0.5 part benzoyl peroxide was then mixed with the maleic hydride adducts of Polymers A and B in various proportions. These samples were cured between cellophane in a 6" x 6" x 0.100" single-cavity mold, curing one hour in a press at 200° F. Evaluation results were as follows:

| Maleic anhydride adduct of— | Percent cat. styrene | Tensile, p.s.i. | Elongation, percent | Hardness |
|---|---|---|---|---|
| Polymer A | 30 | 1,550 | 65 | 55 Shore D. |
| Polymer B | 30 | 1,125 | 60 | 52 Shore D. |
| Polymer A | 50 | Non-elastomeric | | 63 Rockwell R. |
| Polymer B | 50 | Non-elastomeric | | 51 Rockwell R. |

None of the above compositions prepared from diols with molecular weight below 2000 were good elastomers. Even with only 30 percent styrene the polymers were too hard with too low elongation to be considered good elastomers. It was, therefore, concluded that higher molecular weight polybutadiene diols were required. The samples prepared from the unsaturated Polymer A also exhibited poor heat stability when aged in an oven 22 hours at 149° C.

A polybutadiene diol of molecular weight of 10,000 was prepared using the procedure described above. This was essentially completely hydrogenated using platinum oxide as the catalyst and is here identified as Polymer C. The hydrogenated diol was then reacted with maleic anhydride as follows:

Example 5

|  | Grams |
|---|---|
| Polymer C (hydrogenated polybutadiene diol), .00916 mole, 10,000 M.W. | 91.6 |
| Maleic anhydride, 0.0366 mole, approximately 100% excess | 3.6 |

The above mixture was stirred, under nitrogen, at 115 to 125° C. for 15 hours. This maleic anhydride adduct was then mixed with catalyzed styrene as above, and cured 1 hour at 200° F. When evaluated, the following results were obtained:

| Maleic anhydride adduct of— | Percent cat. styrene | Tensile, p.s.i. | Elong., percent | Modulus 100% | Modulus 200% | Hardness |
|---|---|---|---|---|---|---|
| Polymer C | 30 | 900 | 315 | 175 | 525 | 55 Shore A. |
| Do | 50 | 1,667 | 280 | 1,025 | 1,400 | 84 Shore A. |
| Do | 70 | Non-elastomeric | | | | 30 Rockwell R. |

The samples containing 30 and 50 percent styrene were useful elastomers with greatly improved elastomeric properties over the lower molecular weight polymers. Thus it may be seen that the higher molecular weight diol was much more useful as an elastomer than the 1500 M.W. polybutadiene diol. The use of more than 50 percent styrene gave a non-elastomeric product. Excellent heat stability was exhibited using the hydrogenated polybutadiene.

POLYETHER DIOLS

Saturated aliphatic polyether diols of 2,000 to 10,000 molecular weight having terminal hydroxy groups and 2 to 4 carbon atoms between the ether groups can be used. They are usually prepared from such materials as ethylene oxide, propylene oxide, or tetrahydrofuran to give polyethylene ether glycol, polypropylene ether glycol, or poly(tetramethylene ether) glycol. Many of these are available commercially. Their use is explained by the following examples which are illustrative:

Example 6

|  | Grams |
|---|---|
| Polypropylene ether glycol, M.W. 2,000, 0.175 mole | 350.0 |
| Maleic anhydride, 0.3675 mole, 5% excess | 36.1 |

The above mixture was stirred under nitrogen for 17 hours at 125° C., after which time the maleic anhydride adduct of the polypropylene glycol was mixed with styrene (catalyzed with 0.5 part benzoyl peroxide per 100 parts styrene), using recipes containing 10 to 90 percent by weight of styrene to 90 to 10 percent of adduct. The resulting blends were then cured approximately 1 hour at 200° C. in a 6" x 6" x 0.100" single-cavity mold. Hardnesses were determined on the resulting compositions as follows:

| Maleic anhydride adduct of— | Percent catalyzed styrene | Hardness |
|---|---|---|
| Polypropylene ether glycol | 90 | 113 Rockwell R. |
| Do | 80 | 98 Rockwell R. |
| Do | 70 | 10 Rockwell R. |
| Do | 60 | 91 Shore A. |
| Do | 50 | 56 Shore A. |
| Do | 40 | 36 Shore A. |
| Do | 30 | 33 Shore A. |
| Do | 20 | 29 Shore A. |
| Do | 10 | 6 Shore A. |

The samples containing 50 percent styrene and less were quite elastomeric while the samples containing 60 to 90 percent styrene were plastics and exhibited improved impact properties of 0.7 to 11.4 foot pounds notched Izod.

The importance of using the proper molecular weight polyether diol adduct was again illustrated with a series of poly(tetramethylene ether) glycols varying in molecular weight from 1000 to 8400. The maleic anhydride adducts were prepared as described:

Example 7

|  | Grams |
|---|---|
| Poly(tetramethylene ether) glycol, M.W. 1000, 0.40 mole | 400.0 |
| Maleic anhydride, 1.0 mole, 25% excess | 98.1 |

Example 8

| | Grams |
|---|---|
| Poly(tetramethylene ether) glycol, M.W. 2880, 0.139 mole | 400.0 |
| Maleic anhydride, 0.292 mole, 5% excess | 28.6 |

Example 9

| | Grams |
|---|---|
| Poly(tetramethylene ether) glycol, M.W. 5540, 0.054 mole | 300.0 |
| Maleic anhydride, 0.151 mole, 25% excess | 13.3 |

Example 10

| | Grams |
|---|---|
| Poly(tetramethylene ether) glycol, M.W. 8400, 0.024 mole | 200.0 |
| Maleic anhydride, 0.072 mole, 50% excess | 7.0 |

In each of the above examples, the mixtures were stirred under nitrogen at 120 to 125° C. for approximately 6 hours. The products were mixed with catalyzed styrene (0.5 part benzoyl peroxide per 100 parts styrene) in various proportions and cured in a 6″ x 6″ x 0.100″ single-cavity mold for 1 hour at 200° F. Evaluation results of the 50/50 maleic anhydride adduct/styrene compositions are illustrated in the table below.

Styrene copolymers of maleic anhydride adducts

| Example | 7 | 8 | 9 | 10 |
|---|---|---|---|---|
| Hardness | 74 Shore D[1] | 61 Shore A | 58 Shore A | 71 Shore A |
| Tensile, p.s.i. | 2,800 | 1,450 | 1,925 | 2,700 |
| Elongation, percent | 110 | 250 | 380 | 535 |
| Modulus, p.s.i.: | | | | |
| 100% | 2,725 | 225 | 175 | 125 |
| 200% | | 650 | 325 | 225 |
| 300% | | | 825 | 400 |
| 400% | | | | 700 |

[1] This product was non-elastomeric.

The elastomeric properties of the materials in the above table improve as the molecular weight of the polyether diol increases, as may be seen from both the hardness and elongation values listed.

The usefulness of low molecular weight diols may be increased often through the use of joining agents such as diacid chlorides, diisocyanates, or dianhydrides which will increase the diol molecular weight to a desirable range for the use described herein.

For example, by using a molar ratio of 5 moles of a polyether diol of 1000 molecular weight to 4 moles of a diacid chloride such as adipoyl chloride, the diol molecular weight may be extended in excess of 5000.

Example 11

A polyether diol is reacted with acrylic anhydride using stoichiometric quantities or a slight excess of the anhydride as follows:

| | Grams |
|---|---|
| Poly(tetramethylene ether) glycol, M.W. 5540, 0.054 mole | 300.0 |
| Acrylic anhydride, 0.119 mole, 10% excess | 15.0 |

The above are reacted 6 hours at 120° C. An adduct with a molecular weight of about 5680 is obtained. When a portion of the above adduct is mixed with catalyzed styrene (1.0 part benzoyl peroxide per 100 parts by weight of styrene) to give a 50/50 adduct/styrene composition, and the resultant mixture cured a minimum of 1 hour at 200° F., a vulcanized elastomer with excellent properties is obtained.

Example 12

Similarly, a desirable adduct is prepared using:

| | Grams |
|---|---|
| Poly(tetramethylene ether) glycol, M.W. 5540, 0.054 mole | 300.0 |
| Acryloyl chloride, 0.119 mole | 10.8 |

The above are reacted under nitrogen at 70 to 80° C. for 6 hours removing HCl as formed with a stream of nitrogen. Residual acryloyl chloride and HCl may be removed by pulling a vacuum on the reaction flask.

When the above is mixed with catalyzed styrene (1.0 part benzoyl peroxide) to form mixtures containing 20 to 50 percent styrene and cured a minimum of 1 hour at 200° F., very desirable vulcanized elastomers are formed.

REACTIONS OF ADDUCTS WITH OTHER MONOMERS

Example 13

Monomers other than styrene or mixtures of such monomers may be used to copolymerize with the diol adduct. For example, a 64/16/20 styrene/acrylonitrile/acrylic acid mixture was used with the maleic anhydride adduct of a polyether as prepared in Example 9.

It has also been shown that such compositions may be reinforced. An aminosilane treated kaolin, marketed by the J. M. Huber Corporation as Nulok 321 was used in the polymerization, although aminosilane on another inert carrier may be used. Properties, after curing for 1 hour at 180° F., with a post-cure for 20 hours at 212° F., were obtained as follows:

| Monomer | Percent monomer | Parts Nulok 321 | Tensile, p.s.i. | Elong., percent | Modulus 100% | Modulus 300% | Hardness Shore A |
|---|---|---|---|---|---|---|---|
| Styrene | 40 | 0 | 440 | 270 | 125 | | 55 |
| Sty/AN/AA [1] | 40 | 0 | 1,160 | 445 | 75 | 325 | 55 |
| Styrene | 40 | 20 | 550 | 175 | 225 | | 62 |
| Sty/AN/AA | 40 | 20 | 1,500 | 430 | 130 | 750 | 59 |
| Styrene | 40 | 40 | 950 | 190 | 500 | | 72 |
| Sty/AN/AA | 40 | 40 | 1,340 | 305 | 350 | 875 | 70 |
| Styrene | 50 | 20 | 1,275 | 305 | 275 | 1,240 | 70 |
| Sty/AN/AA | 50 | 20 | 2,308 | 440 | 375 | 1,300 | 78 |

[1] 64/16/20 styrene/acrylonitrile/acrylic acid.

From the above table, it is concluded that the mixed vinyl monomers actually improved properties of the elastomers in some cases, as did the Nulok 321 reinforcing agent in most instances. Other reinforcing fillers commonly used in other rubbers may be used as well.

An example of polymerization at room temperature, using a catalyst, follows:

Example 14

| | Grams |
|---|---|
| Adduct of Example 9 | 175.0 |
| Styrene monomer | 175.0 |
| Methylethyl ketone peroxide, 68% | 2.95 |
| Cobalt naphthenate (6% Co) | .28 |

The above materials were mixed well and poured into a bottle, flushed well with nitrogen and capped. After several days at room temperature, the mass had solidified in the bottle, illustrating how these materials might be used as casting or potting compounds. The room temperature cured mass was found to have a hardness of 54 Shore A.

Example 15

Vinyl acetate copolymers of the poly(tetramethylene ether) maleates were also prepared. The maleate adduct was prepared as follows:

| | Grams |
|---|---|
| Poly(tetramethylene ether)glycol, M.W. 7720, 0.0388 mole | 300.0 |
| Maleic anhydride, 0.1168 mole, 50% excess | 11.5 |

The above mixture was heated and stirred under nitrogen at 115–122° C. for 18 hours. This adduct was then mixed with various proportions of vinyl acetate monomer catalyzed with 1 part benzoyl peroxide per 100 parts monomer. The samples were cured in a 6″ x 6″ x 0.100″ mold in a press at 140° F. for 1 hour. The following evaluation results are typical of those obtained:

| Adduct/vinyl acetate | Tensile, p.s.i. | Elongation, percent | Modulus 100% | Modulus 300% | Hardness, Shore A |
|---|---|---|---|---|---|
| 70/30 | 1,325 | 400 | 75 | 400 | 60 |
| 60/40 | 1,350 | 405 | 100 | 530 | 63 |
| 50/50 | 1,375 | 400 | 150 | 700 | 68.5 |

The above products were clear, colorless elastomers with useful properties as may be seen from the above table.

Example 16

Substitution of a portion of the styrene monomer with other vinyl monomers has actually enhanced properties in some cases, as with acrylamide.

The maleate adduct of a poly(tetramethylene ether) glycol was prepared as follows:

```
                                                           Grams
Poly(tetramethylene ether) glycol, M.W. 5200,
  0.1346 mole _____  700.0
Maleic anhydride, 0.3096 mole, 15% excess _____   30.4
```

The above mixture was stirred under nitrogen in a one-liter three-necked flask for 8 hours at 115–125° C. and then mixed with a styrene-acrylamide mixture catalyzed with 0.5 part benzoyl peroxide per 100 parts monomer. The resulting solutions were cured in a 6″ x 6″ x 0.100″ mold for 1 hour at 200° F. The following evaluation results were obtained:

| Adduct/monomer ratio | Percent acrylamide on total | Tensile, p.s.i. | Elong., percent | Modulus 100% | Modulus 200% | Hardness, Shore A |
|---|---|---|---|---|---|---|
| 50/50 | 2.5 | 2,025 | 390 | 275 | 450 | 77 |
| 50/50 | 5.0 | 2,050 | 410 | 375 | 550 | 83 |
| 30/70 | 0 | 150 | 125 | 125 | ------ | 58 |
| 30/70 | 2.5 | 225 | 205 | 100 | 225 | 57 |
| 30/70 | 7.5 | 1,025 | 295 | 175 | 425 | 64 |

Example 17

Another vinyl monomer, t-butyl styrene, was completely substituted for the styrene in the copolymerization with the maleate adducts. The maleate adduct as prepared in Example 8 was used and mixed with t-butyl styrene catalyzed with 0.5 part benzoyl peroxide per 100 parts monomer. The samples were cured in a 6″ x 6″ x 0.100″ mold 1 hour at 200° F. Evaluation results were as follows:

| Adduct/monomer ratio [1] | Tensile, p.s.i. | Elongation, percent | Modulus 100% | Hardness, Shore |
|---|---|---|---|---|
| 50/50 | 1,885 | 235 | 425 | 36D |
| 60/40 | 375 | 150 | 200 | 56A |
| 70/30 | 125 | 80 | ------ | 51A |

[1] Weight ratio of adduct to catalyzed t-butyl styrene.

Example 18

The effect of using a fine precipitated silica (average particle size 0.02–0.04 micron), Hi-Sil 233, marketed by Pittsburgh Plate Glass Company, as a reinforcing agent is illustrated below. The maleate adduct was prepared as follows:

```
                                                           Grams
Poly(tetramethylene ether) glycol, M.W. 75,00,
  0.0400 mole _____  300.0
Maleic anhydride, 0.120 mole, 50% excess _____   11.8
```

The above mixture was heated and stirred under nitrogen at 115–120° C. for 22 hours to form the maleate adduct, and 70/30 maleate adduct/styrene (by weight) blends were then prepared, catalyzed with 1 percent benzoyl peroxide. One sample was thoroughly mixed with 20 parts Hi-Sil 233 per 100 parts adduct/catalyzed styrene solution, and the samples were cured 1 hour at 200° F. Results were as follows when evaluated:

| Parts Hi-Sil 233 | Tensile, p.s.i. | Elongation, percent | Modulus 100% | Modulus 300% | Hardness, Shore A |
|---|---|---|---|---|---|
| 0 | 550 | 327 | 125 | 450 | 59 |
| 20 | 1,875 | 330 | 375 | 975 | 72 |

From the above it may be seen that the fine filler does appreciably improve tensile strength and modulus figures of the cured sample.

We claim:
1. The method of producing elastomers from adducts which are only terminally unsaturated, which method comprises reacting (1)
(a) a polyester diol which is essentially saturated aliphatic and is a diol derivative of a dicarboxylic acid or lactone and has a molecular weight of 2,000 to 20,000,
(b) a saturated aliphatic polyether diol of 2,000 to 10,000 molecular weight having terminal hydroxy groups and hydrocarbon groups of 2 to 4 carbon atoms between the ether groups or
(c) a diol of an essentially saturated hydrocarbon with a molecular weight of 2,000 to 20,000
with (2) an unsaturated aliphatic acid anhydride containing 3 to 14 carbon atoms having the formula

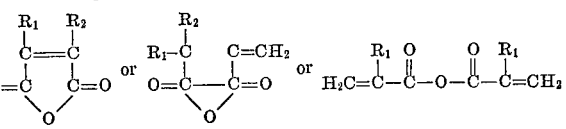

in which $R_1$ and $R_2$ represent hydrogen or alkyl radicals containing 1 to 4 carbon atoms or an unsaturated acid chloride having the formula

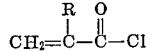

in which R represents hydrogen or an alkyl radical containing 1 to 6 carbon atoms at a temperature of substantially 70 to 135° C.,
and then (3) polymerizing the resulting adduct with 10 to 50 percent by weight of a vinyl monomer or mixture of vinyl monomers polymerizable with a peroxide catalyst at a temperature between room temperature and substantially 250° F.,
which elastomer retracts within one minute to less than 1.5 times its original length after being stretched at room temperature (18 to 29° C.) to twice its length and held for one minute before being released.

2. The process of claim 1 in which the molecular weight of the adduct is substantially 5,000 to 12,000.

3. The process of claim 1 in which the polymerization is effected in the presence of a reinforcing agent of average particle size of 0.002 to 1.0 micron in diameter.

4. The process of claim 1 in which the diol is a polyester diol.

5. The process of claim 1 in which the diol is a polyether diol.

6. The process of claim 1 in which the diol is a saturated hydrocarbon diol.

7. The process of claim 1 in which a diol is reacted with an unsaturated anhydride of an aliphatic dicarboxylic acid.

8. The process of claim 1 in which the diol is a polycaprolactone or an alkyl polycaprolactone in which the alkyl group contains 1 to 4 carbon atoms.

9. The process of claim 1 in which the acid anhydride is reacted with a polycaprolactone or alkylpolycaprolactone diol in which the alkyl groups contain 1 to 4 carbon atoms to produce the adduct.

10. The process of claim 1 in which the diol is reacted with an unsaturated acid chloride.

11. The process of claim 1 in which the polymerization is effected with styrene.

12. The process of claim 1 in which the diol is poly (tetramethylene ether) diol, the adduct is formed with maleic anhydride and the vulcanization is effected with styrene.

13. The process of claim 1 in which the diol is a diol of polycaprolactone or an alkyl polycaprolactone or a mixture thereof, the adduct is formed with maleic anhydride and the vulcanization is effected with styrene.

14. The process of claim 1 in which the diol is hydrogenated polybutadiene diol, the adduct is formed with maleic anhydride and the vulcanization is effected with styrene.

15. Elastomers which are reaction products of adducts which are only terminally unsaturated and which are reaction products of
(1) diols of the class consisting of
   (a) polyester diols which are essentially saturated aliphatic and are diol derivatives of a dicarboxylic acid or lactone and have a molecular weight of 2,000 to 20,000,
   (b) saturated aliphatic polyether diols of 2,000 to 10,000 molecular weight having terminal hydroxy groups and hydrocarbon groups of 2 to 4 carbon atoms between the ether groups and
   (c) diols of essentially saturated hydrocarbons of 2,000 to 20,000 molecular weight having terminal hydroxy groups;
and (2) unsaturated anhydrides of aliphatic dicarboxylic acids containing 3 to 14 carbon atoms and having the formula

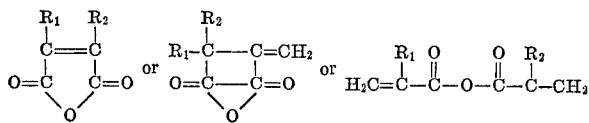

in which $R_1$ and $R_2$ represent hydrogen or alkyl radicals containing 1 to 4 carbon atoms or unsaturated acid chlorides having the formula

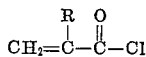

in which R represents hydrogen or an alkyl radical containing 1 to 6 carbon atoms,
said adducts being cross-linked by a polymerizable vinyl monomer, which elastomers retract in one minute to less than 1.5 times their original length after being stretched at room temperature (18 to 29° C.) to twice their length and held for one minute before being released.

16. The elastomer of claim 15 in which the diol is a polyester diol.

17. The elastomer of claim 15 in which the diol is a polyether diol.

18. The elastomer of claim 15 in which the diol is a saturated hydrocarbon diol.

19. The elastomer of claim 15 in which the diol is a polycaprolactone diol or an alkyl polycaprolactone diol in which the alkyl group contains 1 to 4 carbon atoms.

20. The elastomer of claim 15 in which the reaction product is the reaction product of a diol and an unsaturated anhydride containing 3 to 14 carbon atoms; of an aliphatic dicarboxylic acid.

21. The elastomer of claim 15 in which the reaction product is the reaction product of a diol and an unsaturated acid chloride containing 3 to 9 carbon atoms.

22. The elastomer of claim 15 in which the polymerizable vinyl monomer is styrene.

23. The elastomer of claim 15 in which the adduct is the reaction product of poly(tetramethylene ether) diol an dmaleic anhydride and the polymerizable vinyl monomer is styrene.

24. The elastomer of claim 15 in which a reinforcing agent of an average particle size of 0.002 to 1.0 micron in diameter is dispersed throughout the elastomer.

References Cited

UNITED STATES PATENTS

| | | | |
|---|---|---|---|
| 3,160,679 | 12/1964 | Lew | 260—861 |
| 3,345,339 | 10/1967 | Parker et al. | 260—75 |
| 3,427,267 | 2/1969 | Stieger et al. | 260—22 |
| 3,455,802 | 7/1969 | D'Alelio | 204—159.19 |
| 2,824,821 | 2/1958 | Nischk et al. | 154—140 |

FOREIGN PATENTS

| | | | |
|---|---|---|---|
| 924,624 | 4/1963 | Great Britain | 260—861 |

OTHER REFERENCES

Hagemeyer et al., Defensive Publication T870,014, published Jan. 13, 1970 in 870 O.G. 394.

HAROLD D. ANDERSON, Primary Examiner

E. A. NIELSEN, Assistant Examiner

U.S. Cl. X.R.

260—40 R, 75 UA, 75 T, 865, 874

PO-1050
(5/69)

UNITED STATES PATENT OFFICE
CERTIFICATE OF CORRECTION

Patent No. 3,660,532  Dated  March 14, 1973

Inventor(s) Byron H. Werner and Robert A. Hayes

It is certified that error appears in the above-identified patent and that said Letters Patent are hereby corrected as shown below:

Col. 4, line 49

"re-results" should read -- results --

Col. 10, claim 9, line 1 please insert the word "unsaturated" before the word -- acid --

Col. 12, claim 23, line 3

"an dmaleic" should read -- and maleic --

Signed and sealed this 10th day of July 1973.

(SEAL)
Attest:

EDWARD M. FLETCHER, JR.
Attesting Officer

Rene Tegtmeyer
Acting Commissioner of Patents